United States Patent Office 3,263,424
Patented August 2, 1966

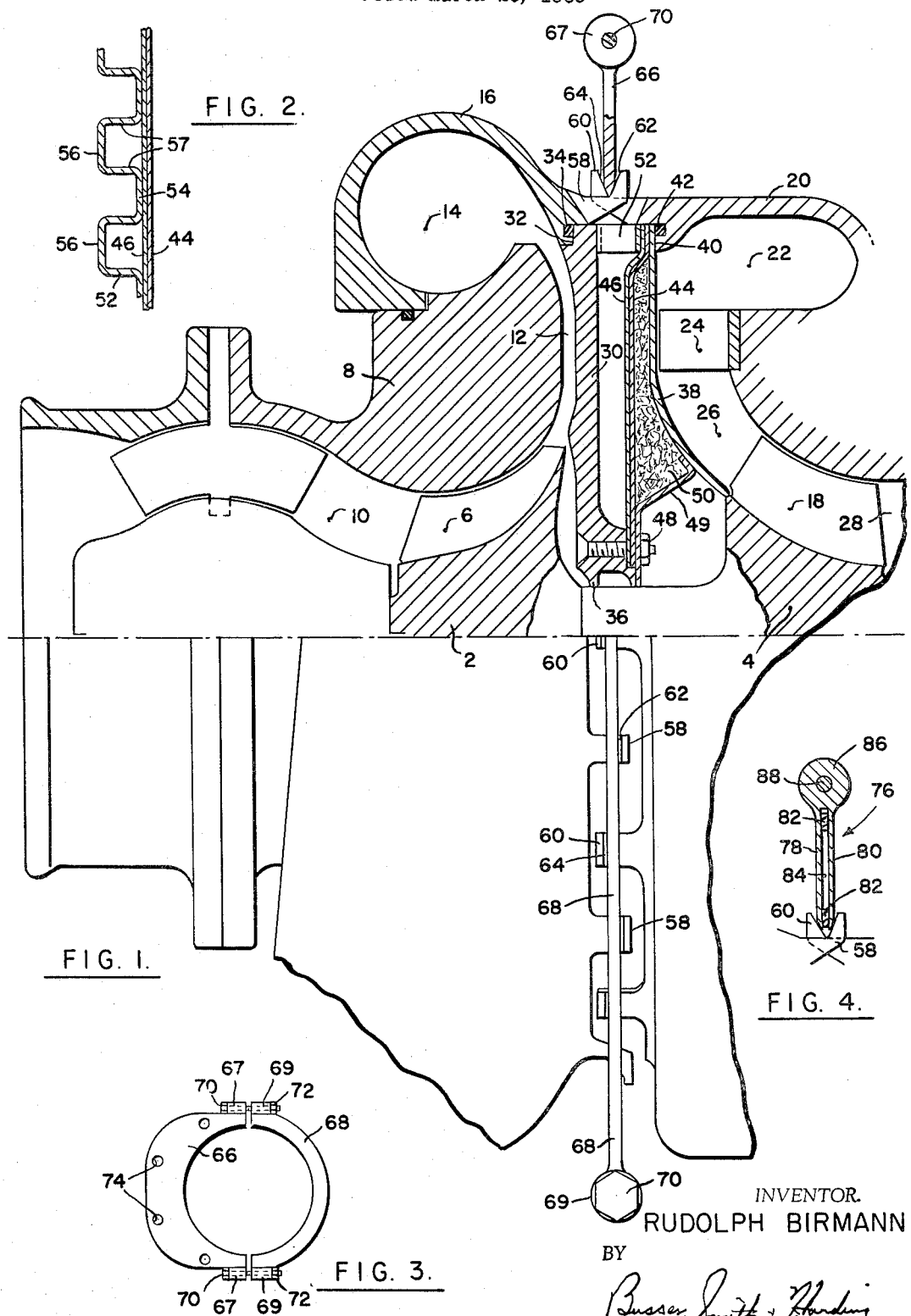

3,263,424
TURBINE-COMPRESSOR UNIT
Rudolph Birmann, R.D. 1, Newtown, Pa.
Filed Mar. 25, 1965, Ser. No. 442,693
12 Claims. (Cl. 60—39.32)

This application is in part a continuation of my application Serial No. 337,382, filed January 13, 1964.

This invention relates to a turbine-compressor unit and has particular reference to a unit involving novel assembly of the turbine and compressor sections.

In turbochargers and other gas turbine power units practical constructions involve the necessity for having fastened very closely adjacent to each other the turbine and the compressor which it drives. This close association makes it a difficult problem to prevent excessive heat transfer from the turbine, which may be operating with combustion gas temperatures as high as 1800° F., to the compressor, the highest temperature in which may be of the order of 350° F. at the discharge and only ambient temperature at the inlet. This great temperature differential gives rise to the tendency of the air undergoing compression to be heated by heat transfer from the turbine. Such heating not only increases the power required to drive the compressor, but in the case of a turbocharger is very detrimental to the performance of the engine. The high temperature gradient involved also gives rise to a difficult problem of allowing differential expansion between the turbine and compressor in such a manner that the highly important concentricity between the two is maintained.

In accordance with the present invention heat transfer is minimized by achieving the following:

The metal cross-sections through which conduction heat transfer can occur are made as small as possible.

The length of the conduction heat flow path is made as long as possible.

Radiation shields are installed between a compressor and the turbine to minimize heat transfer by radiation.

Thermal barriers are provided between the compressor and turbine in the form of insulating material, and an air space through which circulation of air by convection can occur. If desired, this latter space may be used for the circulation of water or oil for cooling, though in practice such an arrangement is not generally practical.

In addition to the thermal problem above mentioned, there are also mechanical problems involved in the connection of turbine and compressor housings. Conventionally, these housings are bolted together, but this is objectionable not only in that it involves great metal masses which permit heat transfer, as well as great rigidity which does not allow for differential expansion, but also that bolting means threading of red hot parts. Such heat often causes threads to fuse together during service, making subsequent disassembly very difficult. To overcome the objections to bolting it is common to use V clamps. Such clamps are satisfactory for joining turbine and compressor housings from the point of view of permitting rapid and easy assembly and disassembly and eliminating cumbersome and space-robbing bolting, but they are quite unsatisfactory in that they result in excessive heat transfer and prevent freedom for differential expansion.

The disadvantages of using bolts or V clamps are eliminated by a novel type of clamping arrangement which is one of the subjects of the present invention.

The advantages of V clamps are retained, but the disadvantages are eliminated.

The general objects of the present invention relate to the provision of a housing assembly for a turbine-compressor unit which has major advantages and eliminates the disadvantages already discussed. This object, together with others relating to details of construction, will become apparent from the following description, read in conjunction with the accompanying drawing in which:

FIGURE 1 is an elevation, partly in section, of a turbo-compressor unit provided in accordance with the invention;

FIGURE 2 is a fragmentary sectional view showing particularly the construction of a spacer;

FIGURE 3 is an elevation illustrating a clamping device provided in accordance with the invention; and FIGURE 4 is a fragmentary section showing a modified clamping ring.

As will be evident, the invention is applicable to turbine-compressor units of widely different forms so far as rotor and housing construction and air and gas passages are concerned, and consequently details of these matters need not be described. The invention is illustrated as applied to a unit involving the connected impeller and turbine wheels 2 and 4, respectively, the former being provided with mixed flow vanes 6 and rotating within the housing member 8, there being provided the usual entrance air flow passage 10 and the vaneless diffuser 12 communicating with the compressed air passage 14 delimited exteriorly by the outer housing member 16.

The turbine rotor carries the blades 18, the turbine being of centripetal type. The turbine housing is shown as 20 and within it there is provided the driving gas chamber 22 from which the gases are directed through either nozzles or guide passages 24 so that the necessary spin is given to these gases in the passage 26 for entry into the turbine passages. The gases are discharged into the region 28 which, if desired, may provide a diffuser.

The rotors are conventionally connected together and rotate concentrically in suitable conventional bearings. For practical purposes they are close together as shown, and it is their proximity to each other which gives rise to the heat transfer problems discussed above. The pressure end of the compressor housing is closed by the annular end cover 30 provided at its outer periphery with an annular seat 32 to receive the housing member 16 with the interposition of a packing ring 34. The inner end of this cover approaches closely, at 36, the rotating connection between the rotors.

The inner end of the turbine portion of the housing is closed by a cover 38 having a shape of revolution to provide a proper boundary for the driving gas passage. The outer annular portion of this cover is received in an annular recess 40 in the housing member 20 with the interposition of a sealing ring 42.

Desirably a pair of heat shields 44 and 46 are secured to the cover 30 by bolts indicated at 48 and have outer peripheral portions which, in assembly, abut each other and the cover 38. An annular member 49 provides an inner wall for the space between the cover 38 and the heat shield 44 in which there is desirably located an insulating material such as asbestos, shown at 50.

A spacer generally indicated at 52 is provided between the outer periphery of the partition 30 and the diaphragm 46. This spacer, which is annular in form, is corrugated in shape as more clearly indicated in FIGURE 2, involving the alternating radial portions 54 and 56 connected by the axial portions 57. As will immediately appear, a clamped partition assembly is provided including, in sequence, the housing member 16, the cover 30, the spacer 52, the heat shields 46 and 44, the cover 38 and the housing member 20. Precise fit is provided by machining one or both of the surfaces of the radial portions 54 and 56 of the spacer. The spacer may be welded to the heat shield 46.

To provide for tight clamping and maintenance of concentricity of the stationary parts, the housing members 16 and 20 are provided about their peripheries with respective claws 58 and 60. As indicated in the lower portion of FIGURE 1, the claws of the two members alternate and are spaced circumferentially at considerable distances from each other, the circumferential extent of each claw being as limited as possible consistent with strength. The claws are provided with the respective inwardly facing tapered surfaces 62 and 64 which, as viewed circumferentially define what amounts to an interrupted tapered groove.

In order to effect clamping, a thin annular ring is formed in two parts indicated at 66 and 68, as most clearly shown in FIGURE 3. The inner edge of this ring is tapered to correspond to the surfaces 62 and 64. The two portions of the ring have the respective bosses 67 and 69 welded thereto or otherwise formed integral therewith. Bolts 70 pass through openings in the bosses and carry nuts 72 to provide tightening to draw the ring portions toward each other and force their tapered edges radially inwardly into the annular groove defined by the surfaces 62 and 64 of the claws.

It is convenient to mount the unit on an engine or other support by providing bolt-receiving openings 74 in one of the members, for example 66 as shown in FIGURE 3.

It will be noted that the claws by reason of their spacing provide an open passage communicating with the opening provided by the spacer 52 and with the annular open space within the partition between the cover 30 and the heat shield 46.

The arrangement described has all of the advantages previously indicated. When the members 66 and 68 are tightly drawn together by the bolts and nuts, a wedging action with respect to the claws occurs producing a tight clamping action of the assembly of peripheral elements already described. While very accurate concentricity is achieved by this arrangement, thermal expansion and contraction are permitted without disturbance of the concentricity by reason of the fact that the members 66 and 68 may flex axially between the ears or claws. These members are made of a thickness such as to maintain tight connection while still being sufficiently flexible to provide for differential expansion.

The arrangement is ideal from the standpoint of minimizing heat transfer. As already indicated, the claws 58 and 60 are not only spaced from each other but have minimum circumferential extent in contact with the members 66 and 68. Conductive heat flow can, accordingly, only occur from the housing 20 to the housing 16 by long paths from each claw 60 circumferentially through one of the members 66 or 68 to the adjacent claws 58. Not only do the members 66 and 68 present minimum cross-sections for the flow of heat, but these members also constitute radiating fins which are cooled by the ambient air. The only heat path is through the axially extending portions 57 of the sheet metal spacer 52. These portions are also of small cross-section, and each is exposed on both of its surfaces to air flowing convectively into and out of the annular space between the partition 30 and diaphragm 46. Since insulation 50 prevents free heat transfer to the heat shields which themselves prevent heat transfer by radiation, it will be evident that the construction as a whole presents a minimum of conductive transfer from the housing portions exposed to the hot gas to the housing portions swept by the air. Radiation is also minimized as will be obvious.

Heat transfer may be further minimized by forming the ring members 66 and 68 and the spacer 52 of stainless steel having relatively poor heat conductivity.

It will be evident from the above that the invention achieves the desired ends of minimizing heat transfer and of providing tight assembly maintaining concentricity of the housings while at the same time permitting, by the spring actions of the members 66 and 68, for differential expansion.

FIGURE 4 shows a modification by the use of which heat transfer is still further reduced. In the modification already described, there is substantial heat transfer still effected through the annular members 66 and 68 between the claws, and this may be further reduced by forming such annular members as limited structures indicated at 76 and comprising a central layer of heat insulating material 82 faced with metal sheets 78 and 80 formed, for example, of stainless steel. The insulating layer 82 may be provided with openings 84 to provide dead air spaces. The insulating material must have high strength in compression and at the same time must be sufficiently flexible so as not to break under the type of flexure already described produced by thermal expansions and contractions. It may consist of a mat or pad formed of asbestos or glass fibers held toegther by a binder of a material such as sodium silicate, the result being a layer highly resistant to high temperatures but at the same time having the properties of effective heat insulation, compressive strength and sufficient flexibility. The two metal sheets may be welded, in the fashion already described to bosses such as 86 to receive clamping screws 88. Joinder by such bosses is at the outer edges of these sheets and of limited extent so that relatively little heat transfer takes place from one sheet to the other. It will be noted that the construction is such that each of the sheets 78 and 80 is in contact with the claws of only one turbocompressor housing so that conductive heat transfer between adjacent claws will not occur.

It will be evident that various details of the invention may be changed without departing from the invention as defined in the following claims.

What is claimed is:

1. A turbo-compressor unit comprising an impeller, an impeller housing surrounding the impeller and providing a passage receiving elastic fluid handled by said impeller, a turbine rotor coaxial with the impeller and connected thereto to drive the same, a turbine housing surrounding the turbine rotor and providing a passage for hot gases, driving the turbine rotor, and means connecting said impeller and turbine housings, said means comprising an annular array of circumferentially spaced projections on each of said housings and annularly extending means engaging said projections, the projections on the respective housings being circumferentially spaced from each other and alternating in their engagement with said annularly extending means.

2. A turbo-compressor unit according to claim 1 in which said projections present tapered surfaces and in which the annularly extending means exerts a wedging action on the surfaces to urge said housings towards each other.

3. A turbocompressor according to claim 1 in which said annularly extending means is radially extended for dissipation of heat.

4. A turbocompressor according to claim 1 in which said annularly extending means is radially extended for dissipation of heat and is flexible to provide a spring action to accommodate thermal expansions and contractions.

5. A turbocompressor according to claim 1 in which said housings are held in spaced relationship by an annular member providing openings for cooling air circulation.

6. A turbocompressor according to claim 1 in which said housings are held in spaced relationship by an annular sheet metal member of zigzag configuration providing openings for cooling air circulation.

7. A turbocompressor according to claim 2 in which said housings are held in spaced relationship by an annular member providing openings for cooling air circulation.

8. A turbocompressor according to claim 2 in which said housings are held in spaced relationship by an annular sheet metal member of zigzag configuration providing openings for cooling air circulation.

9. A turbocompressor according to claim 1 in which said annularly extending means is in the form of a laminated assembly comprising an intermediate layer of heat insulating material faced by metallic sheets.

10. A turbocompressor according to claim 2 in which said annularly extending means is in the form of a laminated assembly comprising an intermediate layer of heat insulating material faced by metallic sheets.

11. A turbocompressor according to claim 3 in which said annularly extending means is in the form of a laminated assembly comprising an intermediate layer of heat insulating material faced by metallic sheets.

12. A turbocompressor according to claim 4 in which said annularly extending means is in the form of a laminated assembly comprising an intermediate layer of heat insulating material faced by metallic sheets.

References Cited by the Examiner
UNITED STATES PATENTS 2,553,220   5/1951   Troeger _____ 285—330 X
2,622,789   12/1952  Lundquist.

MARK NEWMAN, *Primary Examiner.*
RALPH D. BLAKESLEE, *Examiner*